United States Patent [19]

Stana et al.

[11] Patent Number: 5,262,963
[45] Date of Patent: Nov. 16, 1993

[54] AUTOMATIC CONTROL SYSTEM FOR PHOSPHORIC ACID PLANT

[75] Inventors: Regis Stana, Lakeland; Stephen W. Hilakos, Valrico, both of Fla.

[73] Assignee: IMC Fertilizer, Inc., Northbrook, Ill.

[21] Appl. No.: 723,259

[22] Filed: Jun. 28, 1991

[51] Int. Cl.$^5$ .............................................. G06F 15/46
[52] U.S. Cl. ................................... 364/500; 364/166
[58] Field of Search .................. 364/172, 500, 166; 423/320, 11, 18, 20, 167

[56] References Cited

U.S. PATENT DOCUMENTS

| | | |
|---|---|---|
| 3,086,849 | 4/1963 | Goldsmith . |
| 3,104,946 | 9/1963 | Veal . |
| 3,130,187 | 4/1964 | Tolin et al. ............... 364/500 |
| 3,309,507 | 3/1967 | Schlein ..................... 364/500 |
| 3,594,557 | 7/1971 | Anderson . |
| 4,108,957 | 8/1978 | Michel ..................... 423/320 |
| 4,188,366 | 2/1980 | Houghtaling ............ 423/320 |
| 4,332,590 | 6/1982 | Smith . |
| 4,358,827 | 11/1982 | Abbott . |
| 4,402,923 | 9/1983 | Lang ........................ 423/320 |
| 4,485,078 | 11/1984 | Weston et al. . |
| 4,501,724 | 2/1985 | Goers . |
| 4,543,637 | 9/1985 | Smith et al. ............. 364/500 |
| 4,616,308 | 10/1986 | Morshedi et al. ...... 364/500 |
| 4,777,027 | 10/1988 | Davister et al. . |

FOREIGN PATENT DOCUMENTS

| | | |
|---|---|---|
| 1112025 | 9/1974 | U.S.S.R. . |
| 0597632 | 3/1978 | U.S.S.R. . |
| 1511248 | 7/1988 | U.S.S.R. . |
| 1411276 | 9/1989 | U.S.S.R. . |

*Primary Examiner*—Jack B. Harvey
*Assistant Examiner*—Thomas Peeso
*Attorney, Agent, or Firm*—Banner, Birch, McKie and Beckett

[57] ABSTRACT

An improved automatic control system for controlling a phosphoric acid plant in order to maximize recovery of phosphoric acid which includes a programmable computer, a rock flow control and measurement device for controlling and measuring the rock mass flow rate, an acid flow control and measurement device for measuring and controlling the sulfuric acid feed rate, wherein the computer is programmed to calculate the total amount of sulfuric acid added to the reactor, calculate the total amount of rock added to the reactor, over the time interval, calculate a new sulfuric acid feed point to make excess sulfate resulting from reaction of incoming acid and rock to have a predetermined excess sulfate, wherein the predetermined excess sulfate causes the phosphoric acid plant to operate at the maximum efficiency, calculate a number of gallons of sulfuric acid to be added or subtracted to the reactor to correct the excess sulfate of material already in the reactor, and to generate control signals to cause said sulfuric acid feed rate to change which causes said number of gallons to be added or subtracted using a pulse and then decays to the new sulfuric acid set point.

22 Claims, 10 Drawing Sheets

FIG. 4

DEVIATION CONTROL EXAMPLE

| | | |
|---|---|---|
| DEVIATION TIME = 0.0 | DEVIATION = 210.00 | ADJUSTMENT = 0.0 |
| DEVIATION TIME = 1.0 | DEVIATION = 207.70 | ADJUSTMENT = 4.2 |
| DEVIATION TIME = 2.0 | DEVIATION = 201.35 | ADJUSTMENT = 8.1 |
| DEVIATION TIME = 3.0 | DEVIATION = 191.31 | ADJUSTMENT = 11.5 |
| DEVIATION TIME = 4.0 | DEVIATION = 178.16 | ADJUSTMENT = 14.4 |
| DEVIATION TIME = 5.0 | DEVIATION = 162.59 | ADJUSTMENT = 16.4 |
| DEVIATION TIME = 6.0 | DEVIATION = 145.42 | ADJUSTMENT = 17.7 |
| DEVIATION TIME = 7.0 | DEVIATION = 127.45 | ADJUSTMENT = 18.1 |
| DEVIATION TIME = 8.0 | DEVIATION = 109.46 | ADJUSTMENT = 17.8 |
| DEVIATION TIME = 9.0 | DEVIATION = 92.12 | ADJUSTMENT = 16.9 |
| DEVIATION TIME = 10.0 | DEVIATION = 75.96 | ADJUSTMENT = 15.5 |
| DEVIATION TIME = 11.0 | DEVIATION = 61.38 | ADJUSTMENT = 13.8 |
| DEVIATION TIME = 12.0 | DEVIATION = 48.58 | ADJUSTMENT = 11.9 |
| DEVIATION TIME = 13.0 | DEVIATION = 37.68 | ADJUSTMENT = 10.1 |
| DEVIATION TIME = 14.0 | DEVIATION = 28.63 | ADJUSTMENT = 8.2 |
| DEVIATION TIME = 15.0 | DEVIATION = 21.31 | ADJUSTMENT = 6.6 |

FIG. 6

SULFATE CONTROL EXAMPLE CALCULATIONS

| | | | | | | | | | | |
|---|---|---|---|---|---|---|---|---|---|---|
| TARGET | 1.90 | 1.90 | 1.90 | 1.90 | 1.90 | 1.90 | 1.90 | 1.90 | 1.90 | 1.90 |
| MEASURED $SO_4$ | 1.90 | 1.85 | 1.95 | 3.00 | 1.70 | 1.72 | 1.65 | 1.71 | 1.76 | 1.85 |
| TIME OF ENTRY | 11:55 | 1:08 | 2:12 | 3:02 | 4:21 | 5:16 | 6:07 | 7:15 | 8:22 | 9:23 |
| TIME OF SAMPLE | 11:45 | 12:52 | 2:00 | 2:54 | 4:02 | 5:04 | 5:54 | 7:02 | 8:16 | 9:07 |
| MINUTES BETWEEN ENTRIES | | 73 | 64 | 50 | 79 | 55 | 51 | 68 | 67 | 61 |
| SAMPLE DELAY IN MINUTES | 10 | 16 | 12 | 19 | 9 | 12 | 13 | 13 | 5 | 16 |
| TOTAL $H_2SO_4$ (GALLONS) | | 36865 | 32423 | 25157 | 37633 | 28184 | 26162 | 35000 | 34413 | 31302 |
| AVERAGE $H_2SO_4$ (GPM) BETWEEN SAMPLE TIMES | 505.00 | 505.00 | 506.60 | 503.14 | 476.36 | 512.44 | 512.97 | 514.71 | 513.62 | 513.16 |
| TOTAL ROCK (DRY TONS) | | 21900 | 19200 | 15000 | 23700 | 16500 | 15300 | 20400 | 20100 | 18300 |
| AVERAGE ROCK (DTPH) BETWEEN SAMPLE TIMES | 300 | 300 | 300 | 300 | 300 | 300 | 300 | 300 | 300 | 300 |
| OFFSET TO RATIO | 25 | 25 | 25 | 25 | 25 | 25 | 25 | 25 | 25 | 25 |
| ACID EXCESS | | .00 | 92.43 | -90.62 | -2089.38 | 390.34 | 285.25 | 437.24 | 332.63 | 254.38 |
| CALC ACID | | -92.00 | 184.00 | 1927.54 | -2376.40 | 73.38 | -157.36 | 82.44 | 72.34 | 159.42 |
| THEORY ACID | | .00 | 4.85 | -16.93 | -39.64 | 30.92 | 30.24 | 21.24 | 6.68 | 22.32 |
| ADD ACID | | .00 | 87.58 | -73.69 | -2049.74 | 359.43 | 255.00 | 416.00 | 325.95 | 232.06 |
| BASE $SO_4$ | | 1.85 | 1.91 | 3.04 | 2.73 | 1.54 | 1.52 | 1.50 | 1.60 | 1.74 |
| PREDICTED $SO_4$ | 1.90 | 1.85 | 1.95 | 2.99 | 1.68 | 1.74 | 1.67 | 1.72 | 1.76 | 1.86 |
| Ex$SO_4$ | | 1.90 | 1.90 | 1.91 | 1.94 | 1.88 | 1.88 | 1.89 | 1.89 | 1.89 |
| UP COUNTS | .00 | .00 | .00 | 1.00 | .00 | 1.00 | 2.00 | 3.00 | 4.00 | 5.00 |
| DOWN COUNTS | .00 | 1.00 | 2.00 | .00 | 1.00 | .00 | .00 | .00 | .00 | .00 |
| COMBINATION FACTOR | .000 | .000 | .025 | .050 | .225 | .300 | .190 | .215 | .220 | .165 |
| GAIN FACTOR | 1.000 | .999 | .998 | .997 | .996 | .995 | .994 | .993 | 1.017 | 1.041 |
| ACTUAL RATIO | 1.500 | 1.604 | 1.596 | 1.465 | 1.605 | 1.520 | 1.637 | 1.628 | 1.625 | 1.518 |
| HISTORIC RATIO | 1.500 | 1.601 | 1.600 | 1.599 | 1.600 | 1.603 | 1.605 | 1.608 | 1.610 | 1.611 |
| SET RATIO | 1.600 | 1.601 | 1.600 | 1.593 | 1.601 | 1.608 | 1.611 | 1.612 | 1.613 | 1.512 |
| K VALUE | .000 | 4.480 | -4.692 | -97.601 | 19.641 | 14.678 | 20.932 | 15.970 | 12.463 | 3.544 |

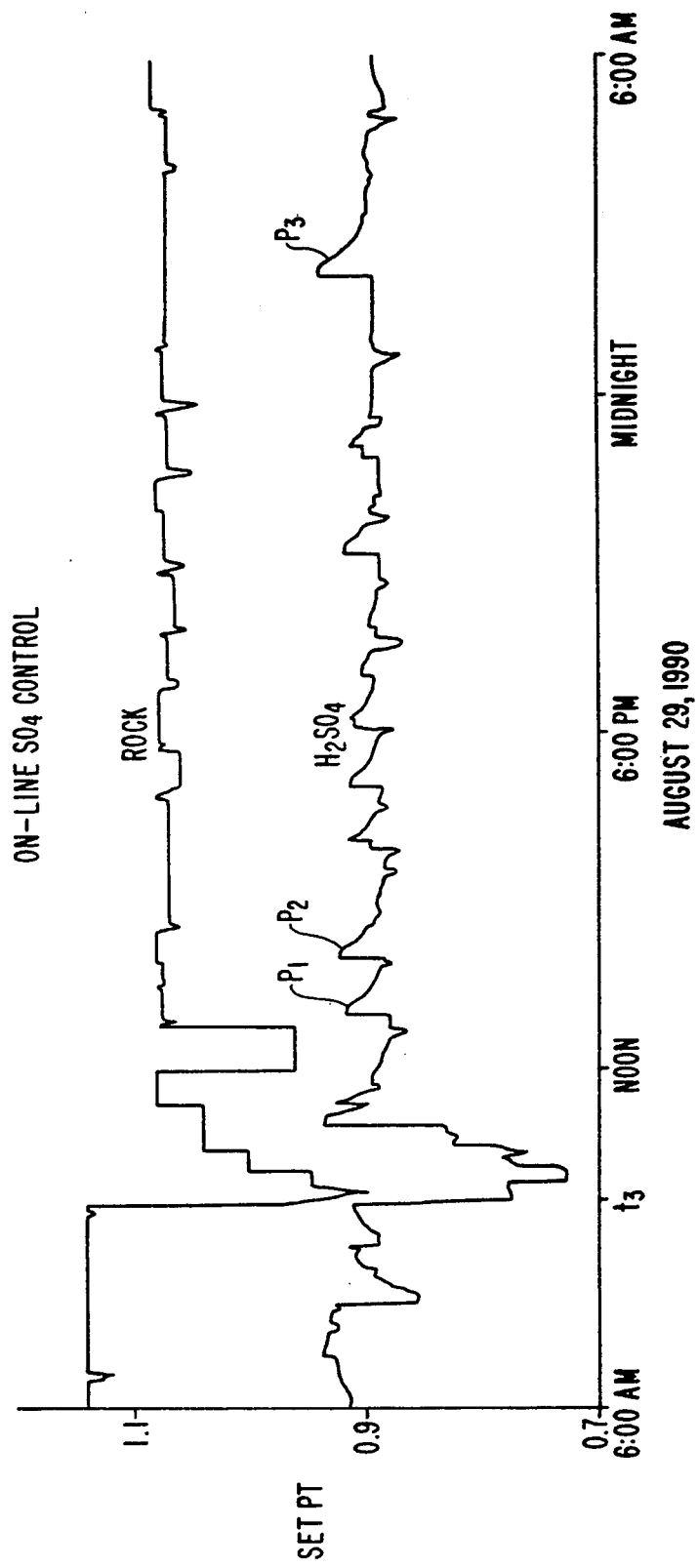

BC (BEFORE COMPUTERS) SO₄ CONTROL
(HOURLY DATA)

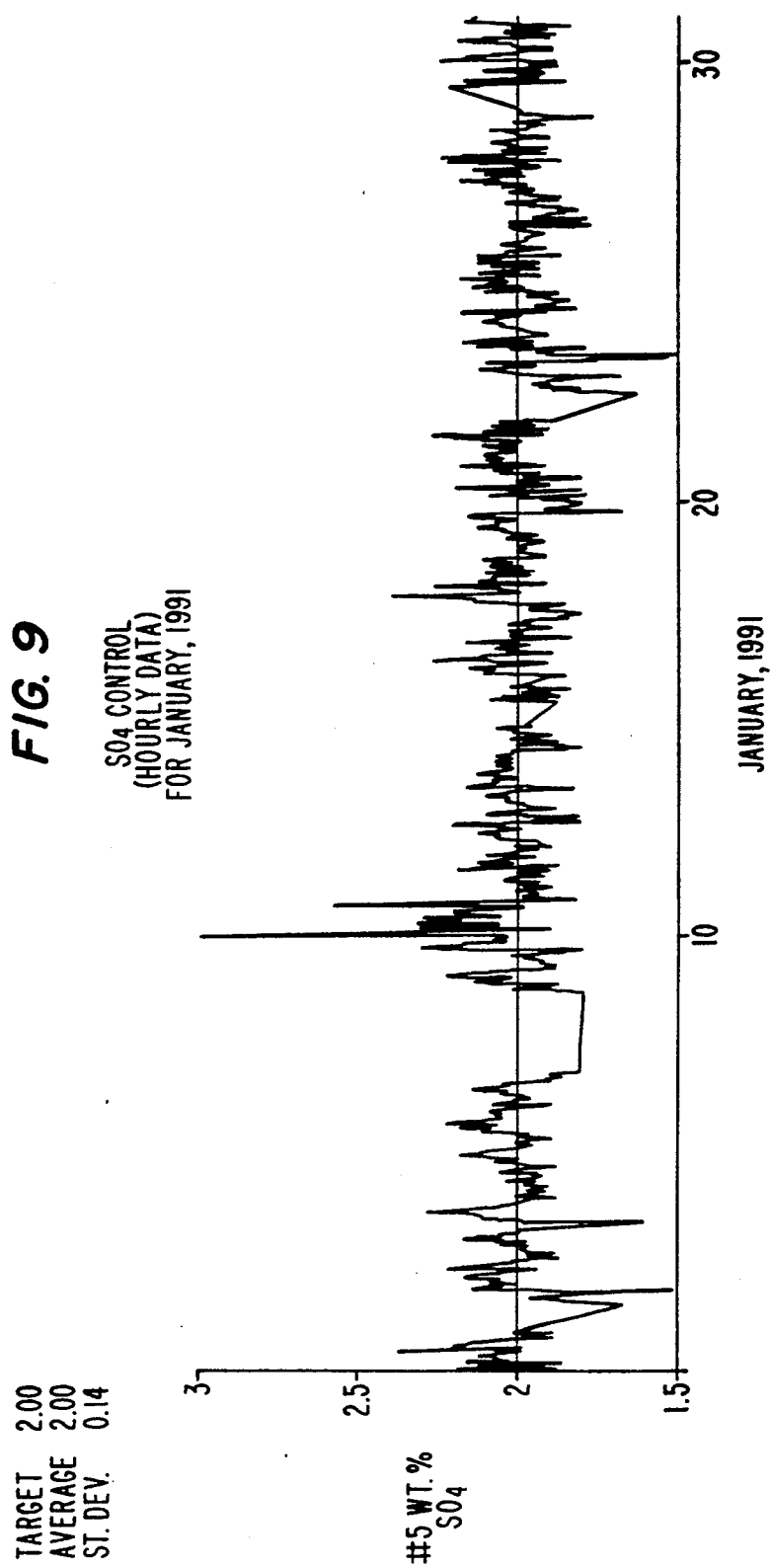

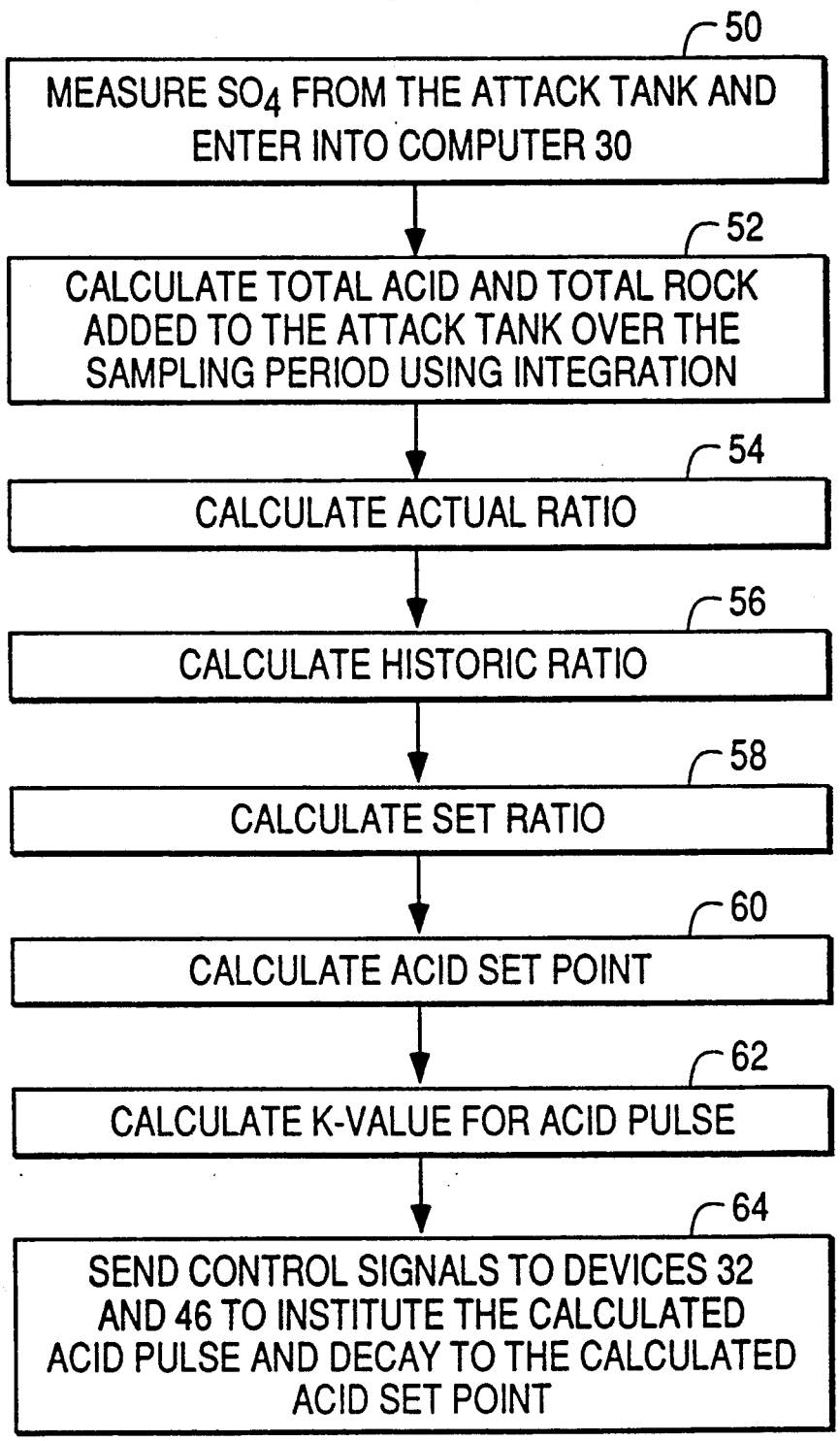

AUTOMATIC CONTROL SYSTEM FOR PHOSPHORIC ACID PLANT

BACKGROUND OF THE INVENTION

1. Field of the Invention

The present invention generally relates to an automatic control system for controlling a chemical reaction in order to maximize efficiency, and more particularly to an automatic control system for controlling the operation of the attack tank in a phosphoric acid plant in order to minimize the cost of production of phosphoric acid. Phosphoric acid ($H_3PO_4$) is an important intermediate chemical product. It is used primarily by the fertilizer industry, but is also used in a number of other areas such as in detergents, water treatment and food products.

Phosphoric acid is primarily produced by what is known in the art as the "wet process." Using the wet process, phosphate rock, which includes calcium, phosphate and a number of impurities, is mined, beneficiated (concentrated) and then ground dry or wet through the use of ball mills or rod mills. The ground rock is fed into an attack tank or reactor and reacted (digested) with concentrated sulfuric acid ($H_2SO_4$). This process may be represented by:

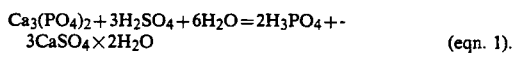

$$Ca_3(PO_4)_2 + 3H_2SO_4 + 6H_2O = 2H_3PO_4 + 3CaSO_4 \times 2H_2O \qquad \text{(eqn. 1)}.$$

This reaction produces phosphoric acid ($H_3PO_4$,) and calcium sulfate ($CaSO_4$) which is a waste product and is commonly referred to as gypsum. This process is illustrated in FIG. 1. Phosphorous pentoxide ($P_2O_5$) is the term most often used to measure plant production rather than $H_3PO_4$. Plant output is referred to in tons of $P_2O_5$, not actual tons of acid. Approximately 4 tons of 30% phosphoric acid equals 1 ton of $P_2O_5$ (Phosphoric acid and $P_2O_5$ may be used interchangeably when referring to plant output).

The goal of a phosphoric acid plant is to maximize the production of phosphoric acid from the limited amount of phosphate rock, and thus, minimize any potential losses of phosphoric acid. An important factor influencing the efficiency of a phosphoric acid plant is the amount of free or excess sulfate ($SO_4$)(measured as weight % of excess sulfate) in the reactor or attack tank. The amount of excess sulfate constitutes the amount of sulfate not reacted with calcium or in the form of $CaSO_4$. On this basis, "excess sulfate" may be either a positive or a negative number (positive representing an excess of sulfate, and negative representing a deficiency of sulfate).

The process shown in equation 1 produces two chemical products: calcium sulfate crystals (gypsum—a waste product), and phosphoric acid. A properly operating phosphoric acid plant results in a high yield of $P_2O_5$ recovery from the attack tank slurry, and the formation of calcium sulfate crystals which contain little unreacted phosphate, and have a shape, size and porosity that filter easily. Level of excess sulfate is one of the most important factors governing crystallization quality.

There are primarily 3 types of $P_2O_5$ losses that may occur in a phosphoric acid process. First are lattice losses or co-crystallized losses which occur due to the precipitation or co-crystallization of $P_2O_5$ with the calcium sulfate. Lattice losses tend to increase as the amount of excess sulfate in the reactor is decreased. Second are coated rock losses which are due to an over-vigorous calcium sulfate (gypsum) crystallization which in turn causes phosphate rock particles to be covered by a gypsum shroud before the particle can completely react, thus shielding the particles from further attack (reaction) by the sulfuric acid. Any phosphate rock particles which become coated with gypsum result in a loss of $P_2O_5$ production because this unreacted phosphate is thrown out along with the other solid matter (gypsum) in the tank slurry after filtering. Coated rock losses increase as the excess sulfate in the attack tank increases. Coated rock losses may also vary to some extent with the quality and with the fineness of the phosphate rock particles (rock quality is usually measured as a grade (a numerical value) in units of bone phosphate of lime (BPL)). Third are acid losses which occur due to inadequate filtration. Gypsum crystal size, and thus filtration characteristics, are primarily determined by the variability in the excess sulfate. In a properly operated phosphoric acid plant lattice losses (1) and coated rock losses (2) usually account for a majority of the acid losses encountered.

FIG. 2 illustrates theoretically how the amount of $P_2O_5$ recovery is heavily dependent on the amount of excess sulfate in the reactor. The graph of FIG. 2 represents how the recovery of phosphoric acid ($P_2O_5$) varies as the amount of excess sulfate (wt. % excess sulfate) changes between 0% and 4%. For this theoretical plant, $P_2O_5$ recovery is maximized when the excess sulfate in the reactor is maintained at approximately 2%. For a different plant or if the plant operation rate is increased or decreased, the optimum operating point (target) may be different. Periodic efficiency tests can reveal any changes in this optimum operating point. If the excess sulfate in the reactor decreases below the optimum point of about 2% excess sulfate, increased lattice losses cause a decrease in $P_2O_5$ recovery of the plant. Similarly, if the plant is operated above the optimum point of 2% excess sulfate, $P_2O_5$ recovery also suffers due to increased coated rock losses. Therefore, to maximize production of $P_2O_5$, the amount of excess sulfate in the reactor should be maintained as close as possible to this predetermined optimum (target) operating point. The determination of the optimum point of operation for a particular facility is well within the skill of the phosphoric acid process control art.

Many problems may arise when attempting to maintain the excess sulfate in the reactor at this predetermined optimum point. If, for example, the optimum operating point was found to be 0% excess sulfate, then the amount of sulfate desired in the reactor is that amount that allows a complete reaction of all phosphate and results in no (0%) excess sulfate present. The amount or flow rate of sulfuric acid necessary to achieve this optimum operating point will need to vary based on several factors including (i) the mass flow rate of the rock (usually measured in tons/hour), (ii) the quality or grade of the rock CaO content), (iii) rock fineness, (iv) reactor temperature, etc. Therefore, the flow rate of sulfuric acid which is fed into the reactor (attack tank) necessary to achieve the optimum operating point (sulfuric acid demand) will be different for different mass flow rates, rock qualities and fineness of incoming rock.

The quality or grade of the rock is determined by the percent of calcium present in the rock and the type and amount of impurities also in the rock. The fineness of the rock is determined by the rock itself and the process and equipment used to grind the rock. The mass flow rate of the rock, which may be considered to be the operating rate or speed of the plant, can be measured using a magnetic flow meter (if rock is fed as slurry) to determine volume flow of rock per unit time, and a nuclear density meter to measure the density of the rock slurry. Using these two values, the mass flow rate of the rock (tons/hour) may be calculated. For any particular rock type (including fineness, quality, etc.) there exists some demand of sulfuric acid (S) per ton of rock (R), which may be represented as the ratio S/R, which produces the desired level of excess sulfate in the reactor. This may be referred to as the set ratio. The excess sulfate level in the reactor may be tested manually using well known laboratory methods, such as by precipitation as barium sulfate and by measuring turbidity. The acid flow rate and the rock mass flow rate must be monitored and adjusted to maintain the excess sulfate level in the reactor equal to this predetermined level. For example, in one approach the rock mass flow rate may be held approximately constant and the flow rate of the sulfuric acid then adjusted to maintain the desired S/R ratio which produces the desired excess sulfate level.

However, several additional problems exist which often hinder attempts to run the plant at this optimum operating point. First, the quality and fineness of the incoming rock are constantly changing because the quality of the rock and type of impurities in the rock vary widely among different ore sites, and even at the same site. Thus, the desired S/R ratio must frequently be updated in order to maintain the reactor at the optimum level of excess sulfate. Unexpected difficulties such as mechanical problems (i.e., broken pumps, stuck valves, and the like) often prevent maintaining the flow rates at a known constant level, and may cause the excess sulfate level in the reactor to change drastically before any malfunction is detected. Even if the sulfuric acid flow rate is properly adjusted for the particular incoming rock, the excess sulfate already present in the reactor may not be correct. Therefore, an additional adjustment in the sulfuric acid flow rate must be made to correct for any sulfate excess or deficiency already in the reactor. In addition, after an adjustment in the sulfuric acid flow rate has been made, there is an unavoidable lag time before the excess sulfate level in the reactor changes in response to the new acid flow rate.

2. Description Of Related Art

Prior systems have attempted to control the production of phosphoric acid and the amount of excess sulfate in the reactor. Historically, sulfate control has been achieved by using large tanks for the attack process with periodic manual measurement of the excess sulfate in the tank, followed by adjusting, as needed, the acid or rock feed rates. Because an operator obtained little guidance about the myriad of factors influencing operation in such a system and thus was left in the dark as to what changes were required, different operators often would make entirely different changes under the exact same operating conditions. Using this procedure, it has only been possible to maintain an excess sulfate value that typically has a standard deviation of about 0.5 around the desired optimum.

There have been attempts to improve sulfate control. Generally, the approaches utilize continuous analysis of the rock (for calcium or $P_2O_5$ content) or continuous analysis of the sulfate in the reactor or attack tank. However, these measurement devices were prone to breakage (clogged pipes, corrosion of internal parts, etc.) and thus usually required full time maintenance. Because of prohibitively high costs (initial cost and maintenance costs) and unstable measurements, such on-line measurement techniques have been abandoned by most plants. Even with constant measurement of the sulfate level in the attack tank, maintaining the sulfate level at the optimum point is still extremely difficult because generally one does not know what types of changes are necessary as well as what degree of change is needed to return the sulfate level to the desired optimum.

In 1988, IMC Fertilizer, Inc., New Wales, Fla., implemented an "advisory system" using a computer to assist in plant control. The computer for this system required the operator to input data hourly into the computer on the measured level of excess sulfate in the attack tank and or other operating conditions of the reactor. The computer then performed a mass balance to determine if a rock change had occurred in the last hour. Next, the computer compared the expected level on the last correction made of excess sulfate vs. the actual level of excess sulfate for the last 4 hours to determine if the calculations needed to be adjusted for any changes in the reactor, etc. If the measured excess sulfate level was within a certain narrow control range of the target (optimum), a change in sulfuric acid flow was recommended to the operator. If the measured level of excess sulfate was outside the narrow control range, then both a sulfuric acid spike or pulse (positive or negative) and a change in the sulfuric acid flow rate were recommended to the operator. The data and calculations were saved by the computer for further processing.

Because changes in the acid flow rate only compensated for any change in rock mass flow rate, rock quality, etc. in some cases, the recommended sulfuric acid spike was necessary to correct the sulfate level of the material already in the tank. Even though this system constituted an improvement over prior art systems and in practice reduced the standard deviation of the level of excess sulfate in the attack tank around the desired sulfate level by approximately 60%, many problems existed with this system which prevented the operation of the plant continuously at the optimum or target sulfate level.

First, even though the computer recommended a sulfuric acid flow rate of, for example 400 gallons/min., the operator never knew what the actual flow rate was because of unavoidable frequent fluctuations in the flow rate. Thus, the actual flow rate over the last time period actually may have averaged 395 gallons/min. even though the acid flow rate set point was 400 gal/min. This may be due to a pump which did not consistently supply the selected flow rate of acid. Under such circumstances, the total amount of acid added over a particular sampling period had to be estimated using the acid set point because the actual acid feed rate was not known. (No integration was performed.) This severely limited performance. Second, even though the computer may have recommended use of an acid spike of, for example, an additional 200 gallons/min. for 10 minutes to adjust for the material already in the tank, and followed by a readjustment to the original acid flow rate, the actual spike created may be something quite different from what was recommended due to mechanical limitations such as the valves not opening/closing immediately or pumps not capable of providing the increased flow rate, imperfect pump performance, etc. Third, the data processing used to calculate the desired acid flow rate, acid spikes etc., was relatively simple and provided less than superior plant performance. In addition, the data used to calculate recommendations, including past flow rates and past changes made, was never actually known for reasons as discussed above. Therefore, there remained a need for a control system which accurately controlled the various components and procedures in a phosphoric acid plant, including the accurate control of the excess sulfate level in the reactor or attack tank.

SUMMARY OF THE INVENTION

Accordingly, it is an object of the present invention to provide an on-line automatic control system for controlling a phosphoric acid plant.

It is a further object of the present invention to provide an on-line automatic control system for controlling the excess sulfate in the reactor to maximize recovery of phosphoric acid.

It is yet another object of the present invention to provide an automatic control system for controlling a phosphoric acid plant which measures the rock mass flow rate and sulfuric acid feed rate into the reactor continuously.

It is yet another object of the present invention to provide an automatic control system which calculates a new sulfuric acid feed rate and produces an excess sulfate level, resulting from the combination of the incoming rock and sulfuric acid, equal to the optimum excess sulfate.

It is yet another object of the present invention to provide an automatic control system for correcting the excess sulfate level of the material already in the reactor.

It is yet another object of the present invention to provide an automatic control system which can detect erroneous sulfate samples (e.g., sample errors).

In accordance with the present invention, an improved automatic control system for controlling a phosphoric acid plant in order to maximize recovery of phosphoric acid is provided which includes a programmable computer, a rock flow control and measurement device for controlling and measuring the rock mass flow rate into an attack tank, and an acid flow control and measurement device for measuring and controlling the sulfuric acid feed rate to the attack tank. Wherein the computer is programmed to calculate the total amount of sulfuric acid added to the reactor and the total amount of rock added to the reactor over a time interval, and to calculate a new sulfuric acid feed rate to produce an excess sulfate level resulting from the reaction of incoming acid and rock to equal a predetermined value of excess sulfate. The predetermined value of excess sulfate is that level at which the phosphoric acid plant operates at a maximum efficiency. The computer calculates a number of gallons of sulfuric acid to be added to (or subtracted from) the reactor to correct the value of excess sulfate already in the reactor, and to generate control signals to cause the sulfuric acid feed rate to change which causes said number of gallons to be added (or subtracted) by using a pulse (acid spike) and then allowing it to decay to a new sulfuric acid feed rate.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIG. 4 illustrates data for a deviation control example of the present invention.

FIG. 6 illustrates data for calculations of ten sampling periods of the present invention.

FIG. 7 is a graphical diagram of the time varying acid and rock flow rates for a phosphoric acid plant using the automatic control system of the present invention.

FIG. 9 is a graphical diagram of the time varying excess sulfate for a phosphoric acid plant using the automatic control system of the present invention.

FIG. 10 illustrates a sequence of steps which may be performed to operate the automatic control system of the present invention.

DETAILED DESCRIPTION

Figure 1:
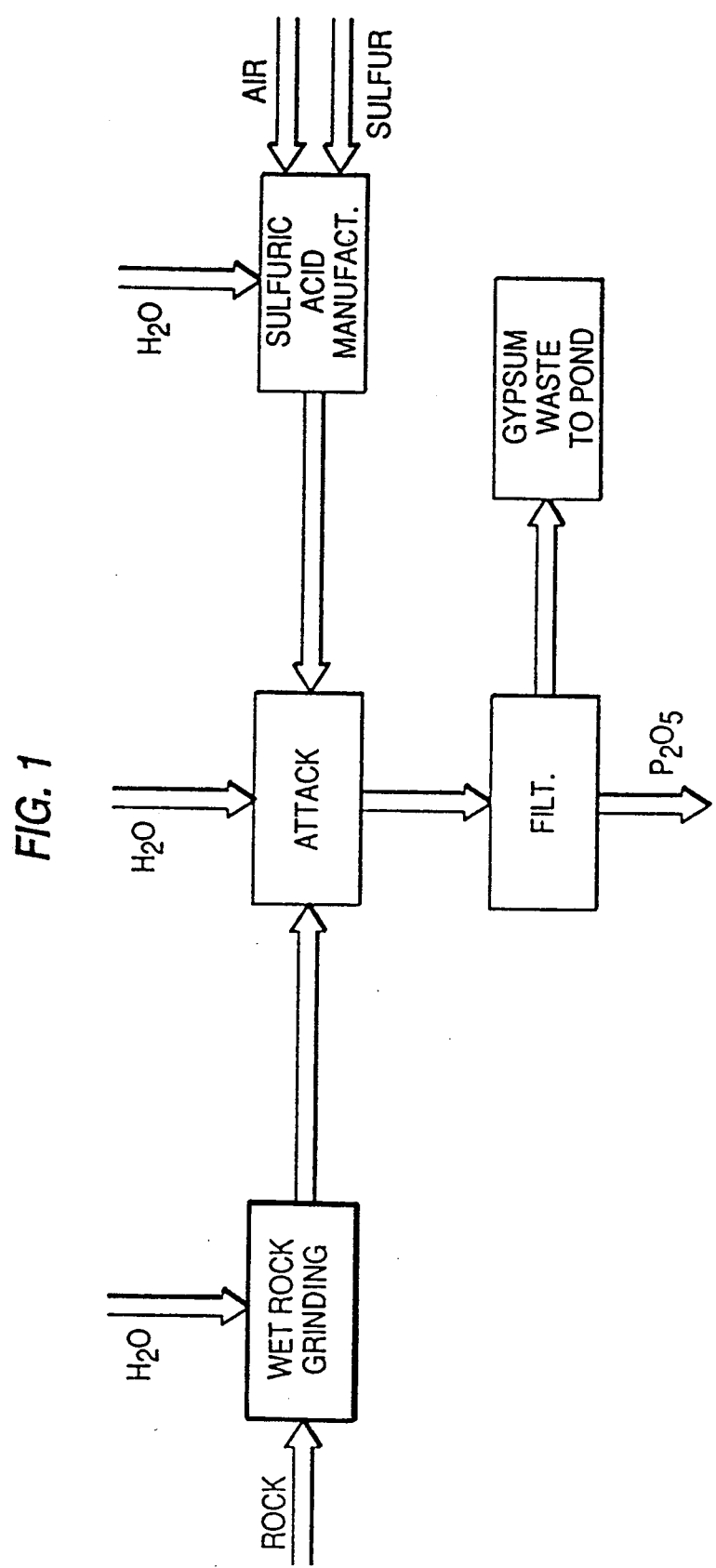
FIG. 1 is a schematic diagram of a typical phosphoric acid plant.
Figure 2:
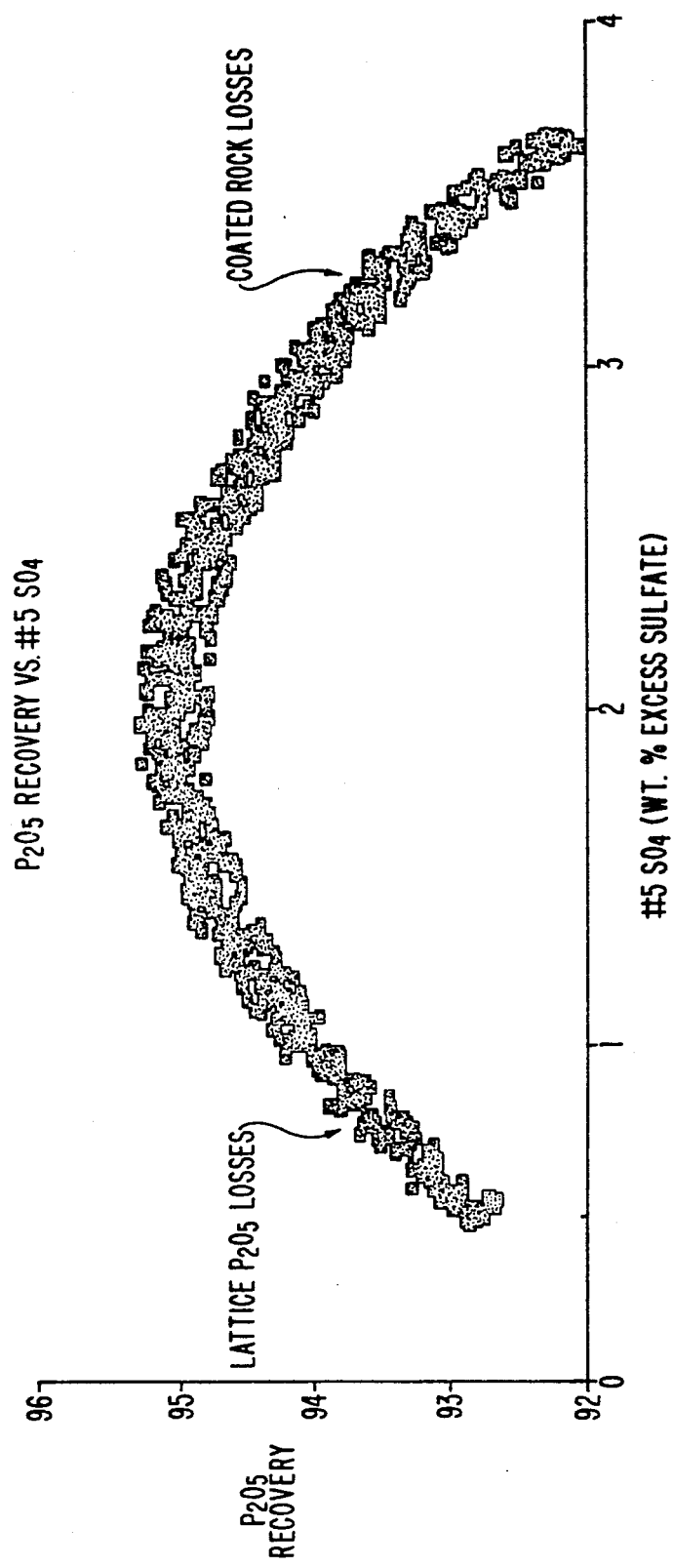
FIG. 2 is a graphical diagram illustrating how the recovery of phosphoric acid ($P_2O_5$) theoretically can vary as the amount of excess sulfate (wt.% excess sulfate) changes between 0% and 4%.
Figure 3:
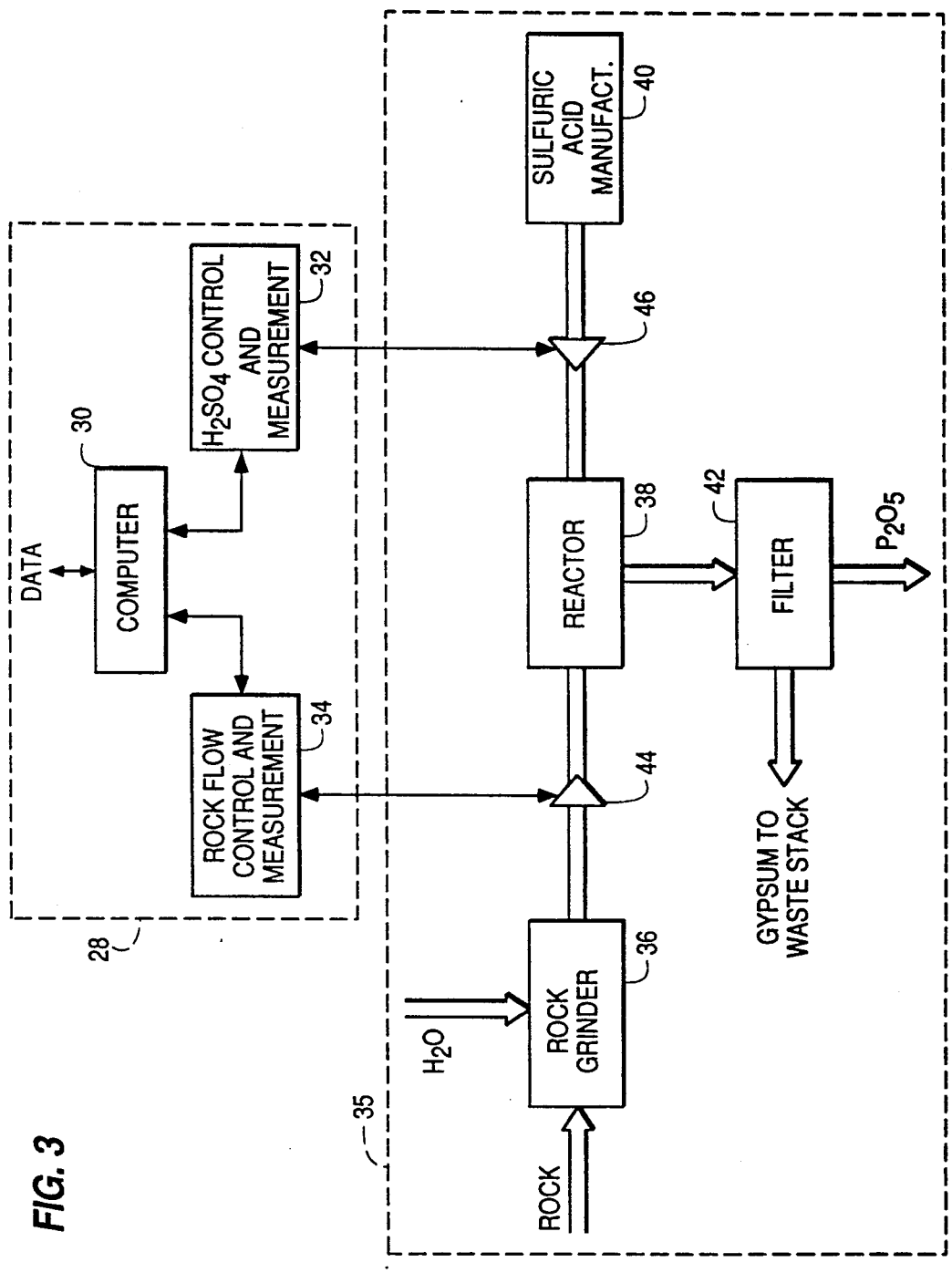
FIG. 3 is a schematic diagram of an automatic control system for controlling a phosphoric acid plant in accordance with a preferred embodiment of the present invention.

Referring to the drawings in detail, wherein like numerals indicate like elements, FIG. 3 is a schematic diagram of an automatic control system 28 for controlling a phosphoric acid plant 35 in accordance with a preferred embodiment of the present invention. Phosphoric acid plant 35 includes rock grinder 36, rock pump 44, reactor (or attack tank) 38, acid pump 46, sulfuric acid plant 40 and filter 42, but may include additional or alternative components found in phosphoric acid plants. Phosphoric acid plant 35 is preferably of the "wet process" type. The rock may be fed to plant either as a slurry or as a dry rock. Also, even though the present invention is applied to the automatic control of a phosphoric acid plant using a computer, the present invention can be applied to other similarly operated chemical, manufacturing or other mixing process where it may be desirable to accurately control the quantity, ratio or feed rate of one or more substances in order to optimize efficiency or minimize costs. It should be understood that the dashed lines in FIG. 3 separating automatic control system 28 from plant 35 have been drawn for explanation purposes, however, automatic control system 28 may include components (for example, acid pump 46) which have been shown in FIG. 3 within plant 35, or components normally found in a phosphoric acid or other plant.

Rock grinder 36 grinds phosphate rock (which may include a number of impurities) and may mix water therewith to form a rock slurry and is coupled to rock pump 44 for feeding the slurry of ground rock into reactor 38. Sulfuric acid manufacturer 40 manufactures sulfuric acid ($H_2SO_4$) and is coupled to acid pump 46 which pumps sulfuric acid from sulfuric acid manufacturer 40 to reactor 38. The rock slurry containing ground phosphate rock is reacted (digested) with the sulfuric acid in reactor 38, which may also be referred to as an attack tank. The rock is dissolved by the acid in the attack tank. The dissolved calcium fraction of the rock is precipitated by the sulfate ions as calcium sulfate. As illustrated by equation 1 above this reaction produces phosphoric acid ($H_3PO_4$), and calcium sulfate ($CaSO_4$) which is a waste product and is commonly referred to as gypsum. Phosphorous pentoxide ($P_2O_5$) is the term most often used to measure plant production rather than $H_3PO_4$, but these terms may be used interchangeably when referring to plant output. Filter 42 is preferably of the tilting pan filter type and is coupled to reactor 38 and filters the output of reactor 38 in order to separate the $P_2O_5$ from the gypsum.

Automatic control system 28 may include computer 30, acid control and measurement device 32 and rock flow control and measurement device 34. Rock flow control and measurement device 34 is coupled to rock pump 44 and both measures and controls the speed of rock pump 44, and thus both measures and controls the rock mass flow rate from rock grinder 36 to reactor 38. Device 34 may include, for example, a magnetic flow meter for measuring the rock flow rate and a nuclear density meter for measuring the density of the rock slurry, or other devices that may together or separately measure and/or control the rock mass flow rate. From the flow rate and density measurements, the rock mass flow rate may be determined. Rock mass flow rate is often measured in tons of rock per hour. Device 34 preferably continuously measures and controls the rock mass flow rate, but alternatively may perform these functions only periodically. Device 34 (or another device not shown) may also perform an analysis of the rock or slurry quality to determine calcium, $P_2O_5$, phosphate or other content of the rock.

Acid control and measurement device 32 is coupled to acid pump 46 and both measures and controls the speed of acid pump 46, and thus both measures and controls the feed rate of sulfuric acid from sulfuric acid manufacturer 40 to reactor 38. These measurement and control functions are preferably performed continuously, but alternatively may be performed only periodically. In addition to what is shown in FIG. 3, device 32 (or another device not shown) may perform a continuous measurement of the concentration of sulfate in reactor 38. Devices 32 and 34 may be partially or completely built into pumps 46 and 44, for example as a built in "smart" controller which may be used for pre-processing.

Computer 30 is coupled to devices 32 and 34 to receive data therefrom and preferably is programmable and preferably includes a central processing unit, memory, combinational and latching circuitry, and input-/output devices for communication with devices 32 and 34, a computer operator, or other device. The input-/output devices, for example, may include a keyboard, cathode ray tube screen, printer or any other device which may be connected to a computer. Computer 30 may also include serial or parallel interfaces or specialized interfaces which allow the interconnection of input/output devices and devies 32 and 34 to computer 30. Computer 30 may also include analog to digital converters and digital to analog converters for the conversion of flow measurement, control and other data or signals between analog and digital formats. Alternatively, devices 32 and/or 34 may include analog to digital and/or digital to analog converters for this data conversion. Computer 30 is preferably a personal micro-computer, but may instead be a microprocessor, microcontroller, mini-computer, main frame computer, series of computers or other suitable device which is preferably programmable. The structures and operation of such computers are well-known in the art of process control design.

Computer 30 operates to monitor and control devices 32 and 34, and thus controls and measures the acid feed rate, rock mass flow rate and other factors in order to maximize the efficiency of the phosphoric acid plant. For reasons as discussed above, maximum efficiency (maximum output of $P_2O_5$) of a phosphoric acid plant occurs when the amount of free or excess sulfate (reported as wt. % excess sulfate) in reactor 38 is maintained as close as possible to the plants' predetermined optimum valve. This predetermined optimum may vary for different plants and plant speeds and can be determined using procedures well known to those skilled in the art of phosphoric acid production from efficiency tests. This predetermined optimum level of excess sulfate in reactor 38 shall hereinafter be referred to as the "target," because it represents the level of excess sulfate that produces a maximum plant output of $P_2O_5$ from a given amount of phosphate rock. Therefore, computer 30 preferably operates so as to maintain the level of excess sulfate in reactor 38 as close as possible to the target.

Computer 30 of the automatic control system of the present invention performs both sulfate control and deviation control. Sulfate control generally is the calculation and institution of rock and acid feed rates that cause the level of excess sulfate in the attack tank to be equal to the predetermined (optimum) value of excess sulfate. In a preferred embodiment of the present invention, sulfate control includes the calculation and institution of a new overall acid feed rate (acid pulse plus a decay to a new acid set point). A sulfate sample is taken from the attack tank and entered into computer 30 at the end of every sampling (time) period. Computer 30 then calculates and institutes the new overall acid feed rate. A sampling (time) period is preferably one hour, and a new sampling period begins when the sulfate sample data is entered into computer 30.

When performing sulfate control, computer 30 calculates an overall acid feed rate for the next sampling period. The overall acid feed rate is the sum of an acid set point and an acid pulse. The acid pulse is calculated to correct for the material already in the tank to bring the excess sulfate level to the target. In the present invention, the acid pulse is then allowed to decay exponentially to the acid set point. The acid set point is the acid feed rate that produces an excess sulfate level, accounting for the incoming material (acid and rock), equal to the target. Thus, the acid set point is matched to the quality, grind, etc. and flow rate of the incoming rock which results in an excess sulfate level equal to the target. By adjusting for the phosphate contribution from incoming rock and for the material already in the tank, the present invention maintains the overall plant excess sulfate level as close as possible to the target to give maximum phosphoric acid production at minimum cost.

At the end of every sampling period, an overall acid feed rate (acid set point and acid pulse) is calculated and then instituted. The overall acid feed rate is calculated using data from several sources: First, computer 30 stores data from calculations of past sampling periods (for example, the actual ratio of the last sampling period). Second, computer 30 receives data from (for example) devices 32 and 34 indicating acid and rock flow (feed) rates which allows computer 30 to calculate the total amount of rock and acid added to the reactor over the last sampling period through integration. Third, computer 30 receives data (which may be inputted manually by the plant operator, for example) on the measured $SO_4$ concentration of attack tank. Using this data, computer 30 calculates the appropriate acid set point and acid pulse at the end of every sampling period. A new sampling period begins when a new sulfate analysis is entered into the computer. Computer 30 changes the acid (and/or rock) feed rate by periodically sending signals to devices 32 and 34 to change the flow rates. In a preferred embodiment of the present invention, the rock feed rate is held approximately constant and the acid feed rate is adjusted to apply an acid pulse and decay to a new acid set point to maintain a desired excess sulfate level in the attack tank. However, alternatively, the acid feed rate could be held constant and then the rock feed rate could be adjusted accordingly. This alternate adjustment technique would require a rock pulse and decay to the new rock set point. Because it is more convenient to control acid flow, the former procedure is preferred.

When performing deviation control, computer 30 enforces the acid and rock set points. For example, if the (desired) acid set point was 400 gallons per minute (gpm), but the actual acid rate was 410 gpm, the actual rate would be decreased temporarily to 390 gpm by computer 30 until the actual number of gallons of acid (based on acid set point) was equal to the desired number of gallons. At that point, the actual acid feed rate would be adjusted by computer 30 back to the set point of 400 gpm. The allowed deviation, between the integrated actual feed rate and integrated acid set point before the feed rate is adjusted decreases from an initial maximum value at the start of each new sampling period. This gives the pumps and controllers time to adjust to the new calculated set point.

The sulfate control performed by computer 30 of the present invention uses adaptive ratio techniques to control the sulfate content of the phosphoric acid plant attack tank. Set points (preferred acid and rock flow rates) are computed using on-line data with feedback provided, for example, by hourly manual operator lab analysis. The present invention automatically adapts to various plant rates, rock feed types, and target sulfate concentrations. The four key components of the present invention are: the ratio calculations, the gain factor for adjustment sizing, the K pulse adjustment technique, and deviation control. The ratio calculations, gain factor and K pulse adjustment are parts of the sulfate control.

RATIO CALCULATIONS

Three ratios used in the present invention are the actual ratio, the historic ratio, and the set ratio and are used to correct the flow rates based on the rock grade to achieve the target excess sulfate resulting from the reaction of acid and rock entering the attack tank, and in general do not correct the sulfate level for material already in the tank. The actual ratio is calculated by computer 30 from the totalized (integrated) values of the sulfuric acid and rock feeds during the last sampling (time) period and is adjusted for changes in the attack tank sulfate concentration. A suitable sampling period is one hour. This period can be longer or shorter depending upon the preference of the operator. To totalize (integrate) the acid and rock flow rates over the sampling period, computer 30 periodically polls the acid and rock feed rates and multiplies each feed rate times its respective polling period, and then adds them together to get the total amount added during the sampling period. Using this discrete integration process, the total amount of acid or rock added to the reactor can be accurately determined. Computer 30 preferably polls the rock and acid feed rates every 0.5 seconds, but may poll more or less frequently.

The historic ratio is a long term exponentially weighted average of the individual actual ratios with adjustment rules that shield the ratio from suspect data during startups and plant upsets. The set point ratio is used in calculating sulfuric set points and is determined by combining the actual and historic ratios in varying percentages according to current plant conditions. All three ratios are calculated by computer 30 every time additional sulfate concentration data is entered into the computer and reflect the rock grade being fed to the attack tank.

GAIN FACTOR

The gain factor controls the size of the sulfuric acid pulse adjustments required to attain the target sulfate concentration for material already in the attack tank. The gain factor appears in most of the calculations concerning attack tank inventory and it indirectly affects the ratio calculations. A form of statistical process control is used to determine if past adjustments were properly sized for current plant conditions. The gain factor is initially set to 1.

K PULSE ADJUSTMENTS

K pulse adjustments involve an acid pulse (positive or negative) and an exponential decay to a set point. The K pulse adjustment technique was developed to handle two areas of concern in the control of sulfate concentration. A technique was needed to force the attack tank sulfate concentration to target as quickly as possible and handle variable sampling periods and delay times with a minimal amount of error and overshoot. In preferred embodiment, the K pulse technique causes computer 30 to add 30% of the required adjustment in the first 10 minutes after sample data entry and 50% in the first 18 minutes. The adjustment (acid pulse) continues to taper off until it reaches a value of zero after approximately 120 minutes. The fact that the total adjustment is 90% complete after 60 minutes minimizes calculation error and avoids the need for strict sampling intervals. The time sensitive portion of the calculation is an exponential decay curve with a time constant preferably of 24 minutes. The adjustment sizing portion of the calculation remains constant until new manual data is entered into computer 30. Obviously, different values for the time constant may be used, and will change the response characteristics in ways that will be apparent to those skilled in the art of process control.

DEVIATION CONTROL

This portion of the automatic control system of the present invention enforces the set points calculated by the sulfate control portion by correcting the actual (measured) flow rates to be approximately equal to the acid and rock set points (desired acid and rock flow rates). Originally designed to correct for pump failures and other large fluctuations in feed rates, the routine was improved to maintain the acid and rock set point to actual flow ratio within about 0.1% on an hourly basis. In the current mode of operation the routine is activated on most sampling intervals.

To determine the deviation in gallons of acid, computer 30 frequently samples and continuously integrates the acid and rock set points and actual flow rates and the set point ratio is compared to the actual flow ratio using the following equation:

Dev. = [(Acid Set/Rock Set) − (Acid Act/Rock Act)]*Rock Act

Dev. = deviation in gallons of acid
Acid Set = totalized desired acid set point
Rock Set = totalized desired rock set point
Acid Act = totalized acid flow rate
Rock Act = totalized rock flow rate.

It is important to note that the set point totalizers integrate the desired set points and not the actual set points being sent to the controllers. When deviation control is active, the routine will send corrective set points to the controllers while continuing to totalize the desired values.

The deviation limit is set to a maximum value at the beginning of a time (sampling) period to allow the controllers to adjust to the new set points. The deviation limit is then decreased over time to force the integrated actual (actual feed rates) set points to be within some maximum allowed deviation of the integrated calculated set points. The deviation limit is preferably set at a value of 370 gallons of acid when new manual data is entered and preferably decreases at a rate of 10 gallons per minute until it reaches 30 gallons. The limit is increased after the sample entry to allow the loop controllers to adjust to new set points. The gradual decrease in the limit allows the routine to detect and correct both large or small deviations before the next attack tank sample. Different numbers may be used for the deviation control, however, the preferred numbers were very successful.

When the deviation from the desired set point ratio exceeds the current deviation limit, a timer is activated by computer 30 and the appropriate rock or acid set point is gradually decreased to force the deviation to less than one-third the limit. Set points are always decreased to maintain the desired acid to rock mixture (set ratio) because an increase in flow may not be possible in certain conditions.

The two factors that determine the amount of adjustment to the set point when deviation control is active are the amount of time in minutes after the deviation has exceeded the limit and the size of the deviation. The product of these two factors determines the magnitude of the adjustment that will be applied to the appropriate set point. The actual equations for the acid and rock set points are as follows (for control deviation):

Acid Set Point = Desired Acid Set − (Dev.Gal*Dev.Time/50)

Rock Set Point = Desired Rock Set + (Dev.Gal*Dev.Time/50)/Set Ratio.

The formula for the acid set point is used if the deviation indicates excess acid and the formula for the rock set point is used if a need for acid is indicated. Both formulas reduce the transmitted set point of either the rock or acid. The deviation gallons will be a negative value if the rock set point equation is active. Because the deviation is calculated in gallons of sulfuric acid, the current value for the acid to rock set point ratio is needed to convert the rock adjustment into the appropriate units. The value of 50 in the equations is a tuning constant controlling the rate of response. The deviation time is the amount of time in minutes from when the deviation exceeded the limit until it is less than one-third the current limit.

Computer 30 gradually reduces the appropriate set point until the product of the deviation gallons and the deviation time begins to decrease. As the product of the two factors decreases, the affected set point increases until it reaches the desired set point or the deviation gallons fall below one-third the current deviation limit. To prevent mechanical damage to plant equipment, deviation control cannot force flow rates below some minimum value, for example, 50 for the rock and 100 for the acid. The deviation control routine operates on computer 30 concurrently with the sulfate control routine. FIG. 4 illustrates a deviation control example. "Adjustment" refers to the amount of acid decreased or can be converted to the amount of rock decreased using the set ratio formula.

DEFINITION OF TERMS FOR SULFATE CONTROL

Target

The target value is a manual input to the program and is the sulfate concentration (% wt. excess sulfate) desired at a particular point in the attack tank, such as typically in the fifth compartment of an 8 compartment attack tank.

Measured SO4

The measured $SO_4$ (sulfate) value (% wt. excess sulfate) is a calculated input to the program. It may be based on the turbidity measurement of a sample from the particular point in the attack tank for which the target is meant and is prepared by the plant operator.

Time of Entry

The current clock time on the computer when a new value is entered for turbidity.

Time of Sample

The current clock time on the computer when a button push has been detected on a momentary contact switch located by the sample port of the fifth compartment in the attack tank from which the sample is taken.

Minutes between entries

Calculated by difference from the clock times of the current and previous sample entry times.

Sample Delay

Calculated by difference from the clock times of the sample entry time, and the sample push button time (time when the sample was taken). This value is assumed to be 12 minutes if a button push is not detected.

Total H2SO4 (gallons)

This value is obtained by totalizing or integrating with respect to time the sulfuric acid flow rates. The totalizer is reset to zero when a sample entry value is detected.

Total Dry Rock (tons)

This value is obtained by totalizing or integrating the Dry Tons per Hour value. The totalizer is reset to zero when a sample entry value is detected. The Dry Rock Tonnage value is calculated within the local control loop from the rock slurry density and flow rate values.

Average H2SO4 (GPM)

This value is calculated as the total number of gallons of acid added between the samples divided by the time between sample entries.

Average Rock (DTPH)

This value is calculated as the total dry tons of rock added between the samples divided by the time between sample entries.

Offset to Acid Set Point

The offset is a correction factor for rate changes and differs from plant to plant. The offset must be determined empirically. It may be determined by one skilled in the art based on past plant information or statistical analysis of past plant performances. Determining the offset is within the ability of one of ordinary skill in the art. For one particular phosphate plant offset is preferably 25. The acid set point is the new desired acid flow rate (which has been determined to produce an excess sulfate level based on entering rock and acid to be equal to the target) and is measured in gallons per minute.

$$\text{Acid set point} = \text{Offset} + (\text{Rock dtph} * \text{Set ratio})$$

The rock dtph refers to the actual rock rate in dry tons/hour, and is set manually by the plant operator. Rock dtph may also be referred to as the plant speed.

Acid Excess

This is the amount of H$_2$SO$_4$ added during the last time period in excess of the acid calculated from the offset and set ratio formula above. The units are in gallons of H$_2$SO$_4$ and the value is calculated as follows:

$$\text{Acid Excess} = [((\text{Total H}_2\text{SO}_4 - \text{Offset}*dt)/\text{Total Rock}) - \text{Set Ratio}]*\text{Total Rock}$$

The variable dt is the amount of time between sample entries in minutes.

Calc Acid

This value represents the gallons of H$_2$SO$_4$ required to change the concentration in the attack tank from the sulfate concentration of the last Predicted SO$_4$ to the concentration indicated by the current Measured SO$_4$. The difference between the last Predicted SO$_4$ and the current Measured SO$_4$ is multiplied by a factor representing the attack tank volume and several unit conversion factors.

$$\text{Calc Acid} = (\text{current Measured SO}_4 - \text{last Predicted SO}_4)*1840.$$

The last predicted SO$_4$ is the predicted SO$_4$ for the previous sampling period.

Theory Acid

This is the theoretical amount of H$_2$SO$_4$ added to the attack tank in excess of the set ratio calculation during the period between when the sample was taken and when the lab analysis were entered. A delay period of 12 minutes is assumed. This value is replaced by the actual amount of acid added in excess of the set ratio calculation if the sample button was used when the sample was taken. The units are in gallons of H$_2$SO$_4$. The value is determined by integration of the K pulse curve in the theory mode and by the difference in the two acid totalizer readings when the sample button is used. The theory value is calculated as follows:

$$\text{Theory Acid} = 24 * K \text{ value} * (\exp[(12-dt)/24] - \exp[(-dt)/24])$$

where the time constant for the K pulse curve is 24 minutes and dt is the time between sample entries in minutes. The theory value is replaced by a value calculated from the acid totalizer if the sample button was used. The calculation for the sample button mode is as follows:

$$\text{Est.Acid} = \text{Total Acid at Sample entry} - \text{Total Acid at Button Push}$$

$$\text{Est.Rock} = \text{Total Rock at Sample entry} - \text{Total Rock at Button Push}$$

$$\text{Theory Acid} = \{[\text{Est.Acid} - \text{Offset}*\text{Delay}]/\text{Est.Rock} - \text{Set Ratio}\}*\text{Est.Rock}.$$

Add Acid

This value is the amount of H$_2$SO$_4$ added to the attack in excess of the Set Ratio calculation during the time period from when the previous sample data was entered until the current sample was taken. The units are in gallons of H$_2$SO$_4$ and it is calculated as follows:

$$\text{Add Acid} = \text{Acid Excess} - \text{Theory Acid}.$$

Base SO4

This value is a calculated sulfate content for the attack tank and is the assumed base concentration level for extrapolating the Predicted SO$_4$ sulfate concentration. It is calculated by adjusting the current Measured SO$_4$ value by the amount of H$_2$SO$_4$ added in excess of the Set Ratio amount from the last sample entry until the current sample was taken. The equation is as follows:

$$\text{Base SO}_4 = \text{Measured SO}_4 - [\text{Add Acid}/(\text{Gain factor}*1840)].$$

Predicted SO4

This value is the predicted sulfate calculation at the time the sample data is entered. The predicted concentration is calculated by adjusting the Base SO4 concentration by the amount of H2SO4 added in excess of the Set Ratio from the last sample entry. The value is calculated as follows:

Predicted SO4 = Base SO4 + [Acid Excess/(Gain factor*1840)].

ExSO4

The ExSO4 value is the sulfate concentration ex-pected for the current Measured SO4 value. The value is used to determine if Gain Factor adjustments are required.

ExSO4 = Target − (22.3*K Value − Acid Excess)/(Gain*1840).

Up/Down Counts

These values are integer counters indicating the number of sequential adjustments that were less than or greater than the amount required to maintain the target sulfate concentration. Up down counts are values that reflect the number of adjustment pulses in a row that were unsuccessful in correcting the sulfate level. The criteria to determine the adjustment performance is as follows:

IF last Predicted SO4 < Target THEN Test A = 1
IF current Predicted SO4 > ExSO4 THEN Test B = 1
IF Test A + Test B = 1 THEN Up Count = Up Count + 1 ELSE Up Count = 0
IF Test A + Test B <> 1 THEN Down Count = Down Count + 1 ELSE Down Count = 0.

Gain Factor

This value is an adjustment sizing factor used to determine the amount of H2SO4 required to change the attack tank sulfate concentration by 1.0%. Various unit conversion factors are incorporated in the Gain factor's constant multiplier of 1840 to allow the factor to normally vary between a value of 1.0 and 2.0. The Gain Factor is adjusted according to the following criteria:

IF Up Count > 3 THEN Gain Factor = Previous Gain Factor + 0.025
IF Down Count > 3 THEN Gain Factor = Previous Gain Factor − 0.0099
Gain Factor = Previous Gain Factor*0.999

These formulas adjust the gain factor which adjusts the size of the acid pulse. The gain factor is increased, which increases the size of the acid pulse, if the last 4 acid pulses were too small. Similarly, the gain factor is decreased where the acid pulse was too large (overcorrected the excess sulfate) for the last 4 sampling periods. The last equation of this set was added after the original installation. It is designed to keep the system in an over-damped condition where Up Counts are required to maintain the adjustment size. The prior advisory system could only reduce the adjustment size through continued oscillation which amplified process upsets.

Combine Factor

This value represents the percentage of the last Actual Ratio to be combined into the calculation of the next Set Ratio. The combine factor is the absolute value of the average of the last two Delta values where the Delta values are the difference between the Measured SO4 value and the Target. The Delta values are limited to a maximum value of 0.4, a minimum of −0.4. The Delta and Combine Factor are calculated as follows:

| |
|---|
| Old Delta = Delta |
| Delta = Measured SO4 - Target |
| IF Delta > 0.4 THEN Delta = 0.4 |
| IF Delta < −0.4 THEN Delta = −0.4 |
| Combine Factor = abs (Old Delta + Delta) / 2 |

The combine factor is a value indicating the difference between measured SO4 and the target for the last 2 samples.

Actual Ratio

The Actual Ratio represents the acid demand required by the rock feed entering the attack tank during the last sampling period. It is calculated from the acid and rock totalizers and adjusted for attack tank SO4 concentration changes during that sampling period as follows:

Actual Ratio = (Total H2SO4 − Offset*dt − Calc Acid)/Total Rock.

Historic Ratio

The Historic Ratio is a long term exponentially weighted average of the Actual Ratio values. The Historic Ratio is somewhat shielded from highly variable Actual Ratios by substituting the last Actual Ratio for the current Actual Ratio if the current Actual Ratio value deviates from the Historic Ratio value by some set amount, e.g., greater than 0.03 or approximately 2%. The calculations are as follows:

Last Ratio = last Actual Ratio

IF abs (current Actual Ratio − last Historic Ratio) < 0.03 THEN Last Ratio = current Actual Ratio Historic Ratio = 0.875*last Historic Ratio + 0.125*Last Ratio.

A number of different formulas could be used to calculate a historic ratio.

Set Ratio

The Set Ratio is the acid demand per unit of rock that has been calculated to cause the level of excess sulfate from the reaction incoming acid and rock to be equal to the target level of excess sulfate. The Set Ratio value is used to calculate the Acid gpm set point during the next sampling period. The units are gallons per minute of H2SO4 per dry ton per hour of Rock and the value is calculated by combining the Historic and Actual Ratios in the percentages indicated by the Combine Factor as follows:

Set Ratio = Combine Factor*Actual Ratio + (1-Combine Factor)*Historic Ratio.

The Set Ratio is calculated from the actual ratio and the Historic Ratio. The combine factor causes the Set Ratio to be more heavily weighted toward the historic ratio if the measured SO4 is equal to or close to the target. If the measured $SO_4$ is very close to the target, then large adjustments in the set points are probably not necessary because the plant is operating at or near the target level of excess sulfate. Thus, the set Ratio will be equal to the historic if the measured $SO_4$ is equal to the target. If the measured $SO_4$ is not close to the target, the set Ratio is weighted more towards the actual ratio because the historic ratio no longer accurately reflects the current needs of the plant. This may occur, for example, where an instrument has been recalibrated, or where there is a sudden change in the Rock quality.

K Value

The K value is a sizing constant to an exponential decay time function and the actual value is determined by the amount of $H_2SO_4$ required to be added or subtracted (using the k-pulse) to obtain the target sulfate concentration in the attack tank. The time function is an exponential natural decay function with a time constant preferably of 24 minutes which generates a series of values ranging from 1.0 to 0.0 over a 120 minute period. In the preferred embodiment of the present invention, the time function is limited to a maximum value of 0.65 to generate a plateau region for approximately the first 10 minutes. The value of the integral of the time function is 22.3 units, therefore a K Value of 1.0 (which is limited to 0.65 by the time function) supplies 22.3 gallons of $H_2SO_4$. The Acid Pulse is calculated as follows:

K Value=(Target−Predicted $SO_4$)*Gain Factor*1840/22.3

Time Function=exp (−t/24)

IF Time Function>0.65 THEN Time Function=0.65.

Thus, the time function is limited to a maximum value of 0.65 and effectively caps off the acid pulse for approximately 10 minutes before it begins to effectively decay.

Acid Pulse=K Value*Time Function.

Figure 5:
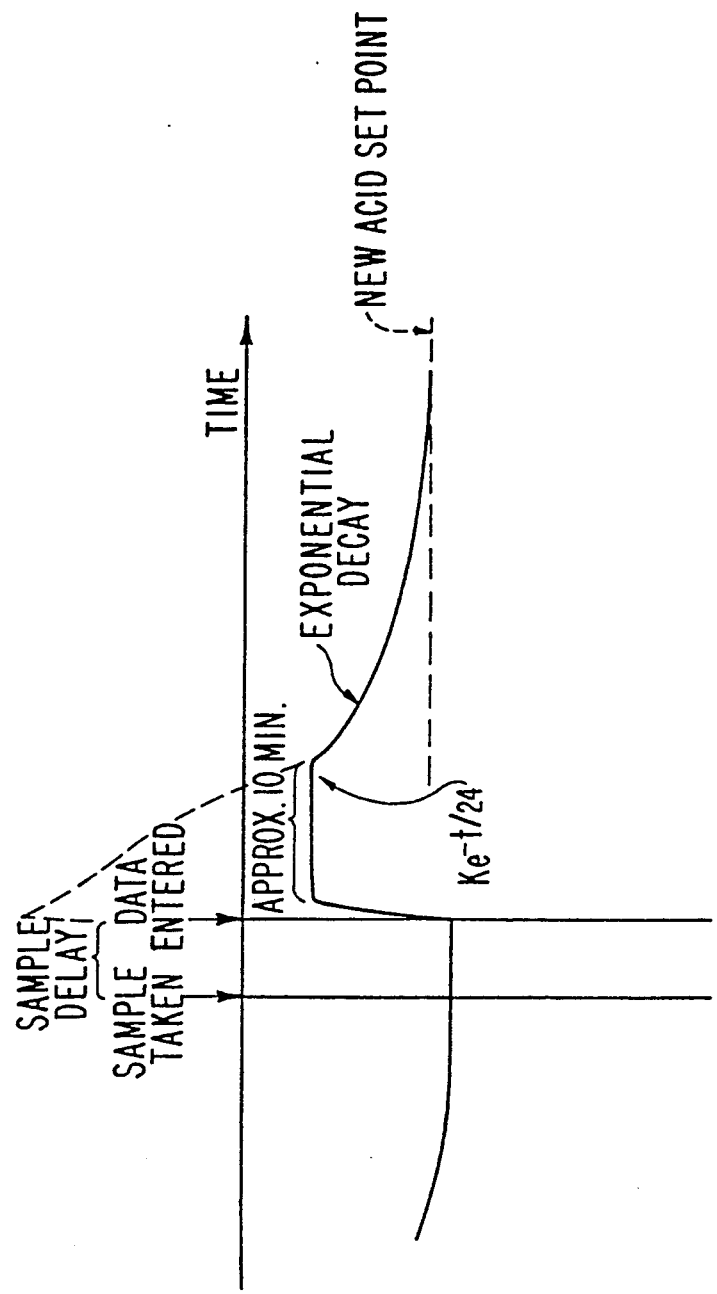
FIG. 5 is an acid pulse and exponential decay to a new acid set point of the present invention.

The Acid Pulse is a (positive or negative) $H_2SO_4$ pulse followed by an exponential decay to the new acid set point. FIG. 5 illustrates how the overall acid feed rate varies from an acid pulse and then decays to the new acid set point. The Acid Pulse is combined with the calculations from the Set Ratio and Offset calculations to produce the overall acid feed rate which is downloaded to acid control and measurement device 32 and acid pump 46 for the next sampling period according to the following:

Overall Acid Feed Rate=Acid Pulse+Acid Set Point

Overall Acid Feed Rate=(K Value*time function)+(Rock Set Point*Set Ratio+Offset).

The advantage of a square pulse (through limiting the exponential function) followed by an exponential decay as opposed to only an exponential function is that the square pulse allows the attack tank to be adjusted quickly but does not require the controllers and pumps to attempt to make the extremely rapid adjustments necessary to track the steep exponential decay during the first few minutes (without square pulse). The acid pulse and decay of the present invention allows the attack tank to be quickly adjusted without forcing the controllers and pumps to respond in a manner which may be physically impossible. In addition, a computer controlled pulse and exponential decay provides increased safety over a manual system. In the present invention, computer 30 calculates the appropriate values for the acid pulse and decay and transmits control signals to acid control and measurement device 32. This method is self limiting because it decays to the set point. A manual increase in acid feed rate is prone to errors because it requires the plant operator to monitor the acid feed rate and manually readjust the feed rate back to the acid set point after the acid adjustment is made.

As described earlier, once data is entered, the deviation control program increases the allowed deviation between the overall acid feed rate and the actual feed rate to allow for devices, controllers and pumps to adjust. This allowed deviation is then decreased to force the actual acid feed rate to be approximately equal to the overall acid feed rate. Throughout the entire process, computer 30 is constantly polling (sampling) the acid and rock feed rates. Even though the actual acid pulse may be slightly delayed or have a slightly different shape, the actual number of gallons of acid (and tons of rock) added is still known due to the continuous totalizing or integration of both feed rates. The totalized number of gallons added is used in subsequent calculations to maintain the excess sulfate level as close as possible to the target.

In the previously used advisory program, the computer had to rely on estimates of the amount of acid (based on the acid set point) added because integration and polling were not performed. Thus, in related systems, the actual number of gallons added was never actually known. The automatic control system of the present invention overcomes these disadvantages. In addition, the present invention allows the pulse of acid to be added and then decrease to the new acid set point much faster than the advisory program. The method of calculating set points and the acid pulse is also much more sophisticated and allows for more accurate control to the target. FIG. 6 illustrates data for calculations of ten sampling periods of the present invention.

The foregoing steps, operations and calculations may be performed to operate the automatic control system of the present invention. In a preferred embodiment, most of these steps, operations and calculations may be performed by programming a computer to perform them. Such programming techniques would be well known to a computer programmer of ordinary skill. It should be understood that the various steps, calculations and constants may be reasonably altered while still calculations feed rates and other adjustments necessary to operate a reaction at a desired target or at maximum efficiency as taught by the present invention.

FIG. 10 illustrates a sequence of steps that may be performed to operate the automatic control system of the present invention. Specifically blocks 50–64 of FIG. 10 illustrate a sequence of steps to perform sulfate control on a phosphoric acid plant according to the teachings of the present invention. In block 50, the operator takes a sulfate sample at the end of a sampling period, preferably from the fifth compartment of an eight compartment attack tank. The sulfate level is measured using well-known techniques, such as through the use of a turbidimeter. The measured value of sulfate ($SO_4$) is then entered manually into computer 30.

In block 52, computer 30 calculates the total amounts of rock and acid added to the reactor over the most recent sampling (time) period through integrating the acid and rock feed (flow) rates. A new sampling period begins when sulfate data is entered into computer 30.

In block 54, computer 30 calculates the actual ratio which is a value representing the acid demand per unit of rock required by the rock for the data of the current sample being processed (current actual ratio).

In block 56, computer 30 calculates the (new) historic ratio as a fractional combination of the previous or last historic ratio and the actual ratio for either the current sample or the last sample. The actual ratio which is selected for use in the calculations depends on how much the current actual ratio differs from the last historic ratio. Because large changes in the sulfate level over a short period of time are unlikely, the current actual ratio will be ignored if it is much different than the last historic ratio, and the actual ratio for the previous sampling period will be used in the calculation. This method is based on the assumption that a large change in sulfate level is most likely an erroneous measurement if it occurs only once, but much more likely to be accurate if it occurs twice or more in a row. According to this method of calculating the new historic ratio, the actual ratio that has a large deviation from the previous historic ratio will be used in the calculation only where it occurs twice in a row.

In block 58, computer 30 calculates the set ratio from the combine factor, the actual ratio and the historic ratio.

In block 60, computer 30 calculates the new acid set point from the rock set point, set ratio and the offset. Blocks 54-60 are steps which may be performed to calculate the new acid set point.

In block 62, computer 30 calculates the K value for sizing the acid pulse. The K-value is calculated from the target, predicted $SO_4$ and the gain factor. The predicted $SO_4$ and the gain factor must be determined by computer 30 prior to calculating the K-value.

In block 64, computer 30 sends control signals to devices 32 and 46 to adjust the actual acid feed rate in order to institute the calculated acid pulse (from the calculated K-value) and to preferably decay to the calculated acid set point.

In addition to the sequence of steps shown in FIG. 10 for sulfate control, the automatic control system of the present invention also performs deviation control concurrently with sulfate control. Deviation control is the adjustment of the actual feed rates so that the actual feed rates are within some allowed deviation from their respective set points. The allowed deviation is set to a maximum when a new acid pulse and set point are instituted to give the pumps and controllers time to adjust. This allowed deviation decreases over time to force the actual feed ratio to be very close to their respective set point ratio. If the deviation exceeds the allowed deviation, then the appropriate feed rate is decreased to compensate for the error.

FIG. 7 is a graphical display of how the rock mass flow rate and the acid feed rate vary with time for the present invention. For example, at time=t3, the rock mass flow rate decreases rapidly. This change was made by the operator in response to some outside problem such as the product tank was full or the filter was not filtering properly. The acid rate at approximately t3 undergoes a negative acid spike to compensate for this decreased rock mass flow in order to maintain the desired set ratio. Acid pulses p1, p2 and p3 each illustrates an acid pulse followed by an exponential decay. Alternatively, the rock mass flow rate may be adjusted by itself or along with the acid feed rate in order to maintain the set ratio.

Figure 8:
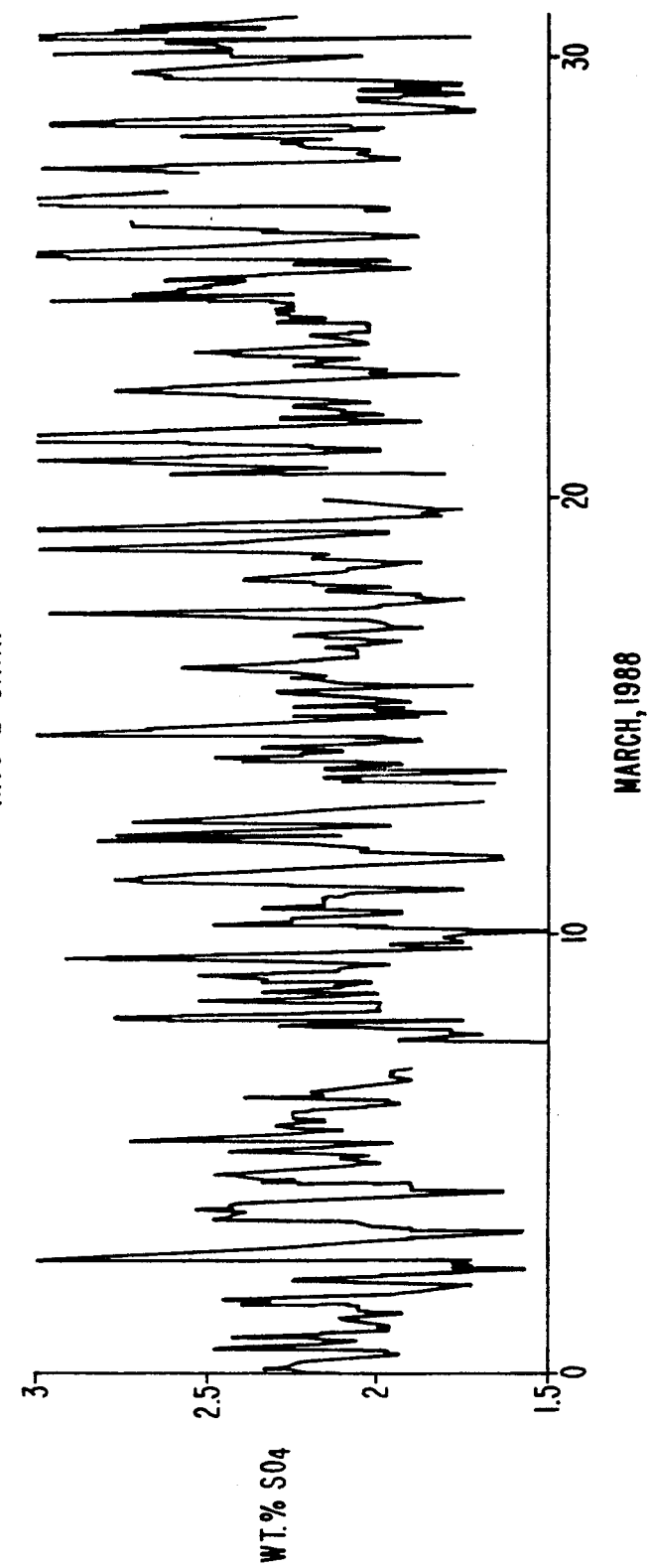
FIG. 8 is a graphical diagram of the time varying excess sulfate for a phosphoric acid plant not using the automatic control system of the present invention.

FIGS. 8 and 9 illustrates how the weight percent excess sulfate varies over time when no computers were used (FIG. 8) and after the present invention was implemented (FIG. 9). A phosphoric acid plant using the automatic control system of the present invention shows a decreased sulfate deviation and allows the control to an average excess sulfate value (2.0%) which for this example had been shown to give maximum efficiency. Using the present invention, the standard deviation around the desired sulfate level has been decreased by 80%.

It should be understood that the method and apparatus of the present invention has been described as applied to a phosphoric acid plant for exemplary purposes. The present invention may be utilized in any reaction or mixing process of two or more substances where it may be desirable to accurately control feed rates, maintain a predetermined ratio of substances in a reaction tank, control the reaction, etc., to produce substances with specific predetermined properties in order to maximize output, efficiency, or obtain some other benefit.

This invention has been described in detail in connection with the preferred embodiments but is for illustrative purposes only and the invention is not limited thereto. It will be easily understood by those skilled in the art that variations and modifications can be easily made within the scope of this invention as defined by the appended claims.

We claim:

1. An apparatus for automatically controlling a reaction of at least two substances, said apparatus comprising:

means for controlling a feed rate of a first substance into a reactor;

means for controlling a feed rate of a second substance into said reactor; wherein said first and said second substances mix and react in said reactor to produce a third substance; and programmable means for:

(a) integrating the total amount of said first substance added to said reactor during a time period;

(b) calculating the total amount of said second substance added to said reactor during the time period;

(c) calculating a new feed rate of said first substance based on the feed rate of said second substance and said total amounts of said first and second substances added during the time period, wherein said new feed rate causes said reaction to operate substantially at a predetermined operating point;

(d) calculating an adjustment amount of said first substance necessary to adjust said substances already in said reactor to react at said predetermined operating point; and (e) causing said feed rate controller of said first substance to automatically change the feed rate of said first substance to add said adjustment amount of said first substance to said reactor or subtract said adjustment amount from said reactor and then to decay to said new feed rate in order to operate the reaction at the predetermined operating point.

2. An apparatus for automatically controlling a phosphoric acid plant to a predetermined operating point, comprising:
   means for measuring actual excess sulfate in a reactor;
   means for integrating a sulfuric acid feed rate during a time period by frequently sampling the sulfuric acid feed rate and calculating a total amount of sulfuric acid added to the reactor during the time period;
   means for integrating a phosphate rock feed rate and calculating a total amount of phosphate rock added to the reactor during the time period;
   means for calculating a new set ratio from the total amounts of phosphate rock and sulfuric acid added to the reactor over the time period, and the actual excess sulfate, wherein the set ratio is the ratio of sulfuric acid demand per unit of phosphate rock which has been calculated to partially control said plant to the predetermined operating point;
   means for calculating a sulfuric acid set point, and a phosphate rock set point; and
   means for adjusting one of said feed rates to be approximately equal to its respective set point to approximately achieve said set ratio.

3. The apparatus according to claim 2 wherein said means for calculating either and means for adjusting one includes means for calculating a sulfuric acid set point and means for adjusting said sulfuric acid feed rate to be approximately equal to said sulfuric acid set point to achieve said set ratio.

4. The apparatus according to claim 2 and further comprising means for calculating an amount of sulfuric acid or phosphate rock to be added to or subtracted from the reactor in order to correct material already in the reactor to control said plant to the predetermined operating point.

5. The apparatus according to claim 4 and further comprising means for performing a sulfuric acid pulse followed by an exponential decay to add or subtract said amount of sulfuric acid to said reactor.

6. The apparatus according to claim 4 and further comprising means for performing a phosphate rock pulse followed by an exponential decay to add or subtract said amount of phosphate rock to said reactor.

7. The apparatus according to claim 5 and including means for conditionally increasing size of said sulfuric acid pulse if the sulfuric acid pulse performed during a previous time period was not sufficient to control the plant to the predetermined operating point.

8. The apparatus according to claim 2 wherein said predetermined operating point is where the actual value of excess sulfate in the reactor is equal to a predetermined value of excess sulfate.

9. The apparatus according to claim 2 wherein said predetermined value of excess sulfate is between $-2$ and 10 weight percent excess sulfate.

10. The apparatus of claim 3 where
    sulfuric acid set point = set ratio * phosphate rock feed rate + offset.

11. The apparatus according to claim 5 where the sulfuric acid pulse and exponential decay is an exponentially decaying time function that is limited to a maximum value.

12. The apparatus of claim 7 and further comprising means for controlling a deviation between the sulfuric acid set point and the sulfuric acid feed rate comprising:
    means for calculating the deviation; and
    means for adjusting one of said sulfuric acid or phosphate rock feed rates to maintain a ratio of the sulfuric acid feed rate to phosphate rock feed rate approximately equal to the set ratio.

13. An apparatus for correcting the excess sulfate in a phosphoric acid plant reactor, said apparatus comprising:
    means for measuring the excess sulfate in the reactor; and
    means for generating a sulfuric acid pulse followed by an exponential decay in order to add or subtract an amount of sulfuric acid to the reactor which approximately corrects the excess sulfate in the reactor to a predetermined value of excess sulfate.

14. An apparatus for automatically controlling a phosphoric acid plant to have a predetermined value of excess sulfate, said apparatus comprising:
    means for measuring an excess sulfate in a reactor;
    means for controlling a sulfuric acid feed rate to the reactor;
    means for controlling a phosphate rock mass flow rate to the reactor; and
    programmable means for:
    (a) calculating a total amount of sulfuric acid added to the reactor over a time period;
    (b) calculating a total amount of rock added to the reactor over the time period;
    (c) calculating a new sulfuric acid feed rate to cause excess sulfate resulting from reaction of incoming acid and phosphate rock to have the predetermined value of excess sulfate;
    (d) calculating a number of gallons of sulfuric acid to be added to the reactor or subtract from the reactor to correct the excess sulfate of material already in the reactor; and
    (e) generating control signals to cause said sulfuric acid feed rate to change and causing said number of gallons to be added to or subtract from the reactor using a pulse of said acid which decays to said new sulfuric acid feed rate.

15. A method for automatically controlling a phosphoric acid plant to maximize recovery of phosphoric acid, said method comprising the steps of:
    determining an amount of sulfuric acid added to a reactor over a time period;
    determining an amount of phosphate rock added to the reactor over said time period; and
    determining a new sulfuric acid feed rate wherein a reaction of incoming rock and sulfuric acid fed in at the new sulfuric acid feed rate results in an excess sulfate approximately equal to a predetermined value of excess sulfate; and
    adjusting said sulfuric acid feed rate whereby the phosphoric acid recovery is maximized at the predetermined value of excess sulfate.

16. The method according to claim 15 wherein determining a new sulfuric acid feed rate comprises:
    calculating a volume of sulfuric acid to be added to or subtracted from the reactor in order to correct material already in the reactor to have the predetermined value of excess sulfate.

17. The method according to claim 16 wherein adjusting said sulfuric acid feed rate comprises:
    adding or subtracting the volume of sulfuric acid to the reactor.

18. The method according to claim 17 wherein said step of adding or subtracting includes the step of performing a sulfuric acid pulse followed by an exponential decay to add or subtract the volume of sulfuric acid to the reactor.

19. A method for automatically controlling a phosphoric acid plant to have a predetermined value of excess sulfate in a reactor, said method comprising the steps of:
   determining an actual rock mass flow rate into the reactor;
   determining an actual sulfuric acid feed rate into the reactor; and
   adjusting either said actual rock mass flow rate or said actual sulfuric acid feed rate to cause the reactor to have the predetermined value of excess sulfate.

20. The method of claim 19 and further comprising the step of calculating a sulfuric acid demand per ton of rock that results in the predetermined value of excess sulfate.

21. A method for correcting the excess sulfate in a phosphoric acid plant reactor, said method comprising the steps of:
   measuring the excess sulfate in the reactor; and
   generating a sulfuric acid pulse followed by an exponential decay in order to add or subtract an amount of sulfuric acid to the reactor which approximately corrects the excess sulfate in the reactor to a predetermined value of excess sulfate.

22. A method for automatically controlling a phosphoric acid plant to maximum efficiency of a reactor for converting phosphate rock to phosphoric acid, said method comprising the steps of:
   measuring an excess sulfate in a reactor;
   controlling a sulfuric acid feed rate to the reactor;
   controlling a phosphate rock mass flow rate to the reactor; and
   calculating a total amount of sulfuric acid added to the reactor over a time period;
   calculating a total amount of rock added to the reactor over the time period;
   calculating a new sulfuric acid feed rate to cause excess sulfate resulting from reaction of incoming acid and phosphate rock to have a predetermined value of excess sulfate, wherein said predetermined value of excess sulfate causes the phosphoric acid plant to operate at the maximum efficiency;
   calculating a number of gallons of sulfuric acid to be added to the reactor to correct the excess sulfate of material already in the reactor; and
   generating control signals to cause said sulfuric acid feed rate to change and causing said number of gallons to be added using a pulse of said acid which decays to said new sulfuric acid feed rate.

* * * * *